US012398592B2

(12) United States Patent
Maurer

(10) Patent No.: US 12,398,592 B2
(45) Date of Patent: Aug. 26, 2025

(54) RETRACTABLE PARTITION WALL

(71) Applicant: Simon-Andreas Maurer, Brasov (RO)

(72) Inventor: Simon-Andreas Maurer, Brasov (RO)

( * ) Notice: Subject to any disclaimer, the term of this patent is extended or adjusted under 35 U.S.C. 154(b) by 98 days.

(21) Appl. No.: 17/418,721

(22) PCT Filed: Dec. 26, 2019

(86) PCT No.: PCT/RO2019/000032
§ 371 (c)(1),
(2) Date: Jun. 25, 2021

(87) PCT Pub. No.: WO2020/139095
PCT Pub. Date: Jul. 2, 2020

(65) Prior Publication Data

US 2022/0074262 A1 Mar. 10, 2022

(30) Foreign Application Priority Data

Dec. 28, 2018 (RO) .............................. a 2018 01146

(51) Int. Cl.
*E06B 9/06* (2006.01)

(52) U.S. Cl.
CPC .......... *E06B 9/0638* (2013.01); *E06B 9/0676* (2013.01)

(58) Field of Classification Search
CPC ........ E06B 9/06; E06B 9/0607; E06B 9/0638; E06B 9/0676
See application file for complete search history.

(56) References Cited

U.S. PATENT DOCUMENTS 5,365,993 A * 11/1994 Jella ...................... E05F 15/673 160/232
5,685,355 A * 11/1997 Cook .................... E06B 9/0638 160/202

(Continued)

FOREIGN PATENT DOCUMENTS

CN 108979452 A * 12/2018 ............. E05C 17/02
CN 112610140 A * 4/2021

(Continued)

OTHER PUBLICATIONS

WIPO, European International Search Authority, International Search Report and Written Opinion mailed Jul. 20, 2020 in International Patent Application No. PCT/RO2019/000032, 11 pages.

*Primary Examiner* — Ryan D Kwiecinski
(74) *Attorney, Agent, or Firm* — Inskeep IP Group, Inc.

(57) ABSTRACT

The invention refers to a retractable a retractable modular partition wall that may be used to partition residential spaces, or it may operate as a garage door that is mounted on two parallel walls of a premises and consists (FIG. 1.1) of an assembled left-side runway. A, that is fastened with the aid of the some known fastening elements, such as dowels and screws, on the conventionally left wall of the premises, an assembled right-side runway, B, mirroring the left-side runway, A, and which is fastened with some known fastening elements, such as dowels and screws, on the conventionally right-side wall of the premises, a drive mechanism. C, and several assembled movable panels, D. The retractable modular partition wall is conceived so that: i) when used inside or outside a building, in retracted state, it looks like a horizontal beam, whereas in expanded state it operates as a wall; ii) when used outside a building, in retracted state it looks like a horizontal beam, whereas in expanded state, it operates as a garage door; iii) it is operated through electronic command and, in case of power failure, it can be (Continued)

driven manually; iv) when used in a premises, whether inside or outside a building, in expanded state, it can operate as a projection screen or an advertising surface.

4 Claims, 20 Drawing Sheets

(56) References Cited

U.S. PATENT DOCUMENTS

| | | | | |
|---|---|---|---|---|
| 2010/0050529 | A1* | 3/2010 | Manser | E06B 9/06 49/199 |
| 2018/0266172 | A1* | 9/2018 | Wray | E05F 17/004 |
| 2019/0316399 | A1* | 10/2019 | Sauve | E05F 15/681 |
| 2022/0098912 | A1* | 3/2022 | Janick | E06B 9/0676 |

FOREIGN PATENT DOCUMENTS

| | | | | | |
|---|---|---|---|---|---|
| DE | 19505999 | A1 | * | 8/1996 | E05D 13/003 |
| DE | 202006011746 | U1 | | 12/2007 | |
| DE | 102010003969 | A1 | * | 7/2011 | E05D 13/06 |
| EP | 1234946 | A2 | * | 8/2002 | E06B 9/0638 |
| ES | 2235666 | A1 | * | 7/2005 | E06B 9/0638 |
| KR | 2015144293 | A | * | 12/2015 | B61B 1/02 |
| KR | 2016003957 | U | * | 11/2016 | E06B 9/02 |
| KR | 2023000295 | U | * | 2/2023 | A62C 2/10 |
| WO | WO-8301271 | A | * | 4/1983 | E06B 9/0638 |
| WO | WO-9621078 | A1 | * | 7/1996 | E05D 15/262 |
| WO | WO-03104594 | A1 | * | 12/2003 | E05D 15/24 |
| WO | WO-2008012084 | A1 | * | 1/2008 | E06B 3/44 |
| WO | WO-2012014245 | A1 | * | 2/2012 | E06B 3/927 |
| WO | WO-2012158147 | A1 | * | 11/2012 | E04B 2/827 |
| WO | WO-2015155793 | A1 | * | 10/2015 | E06B 9/0676 |
| WO | WO-2016003366 | A1 | * | 1/2016 | A62C 2/065 |

* cited by examiner

Figure 1:
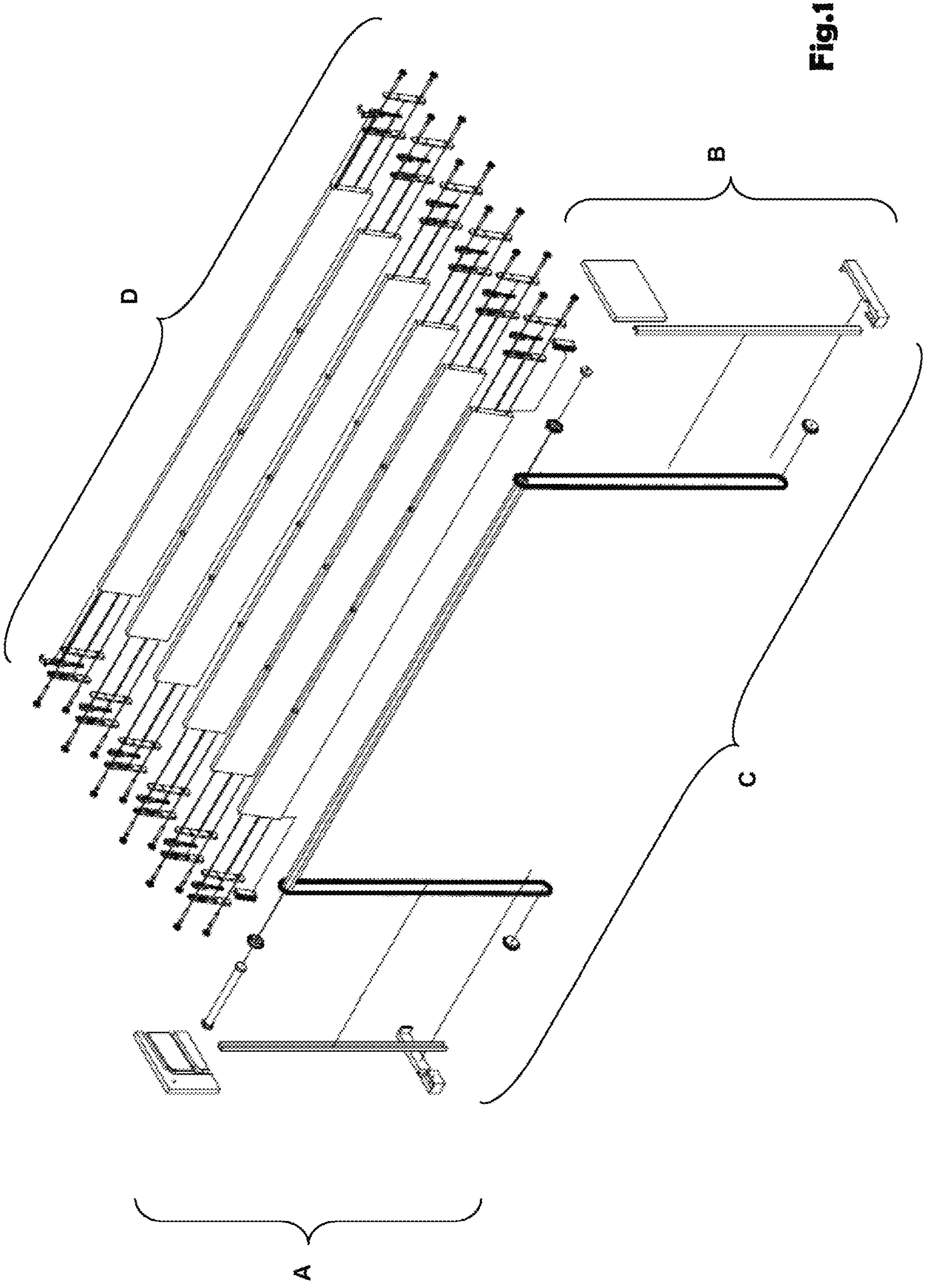

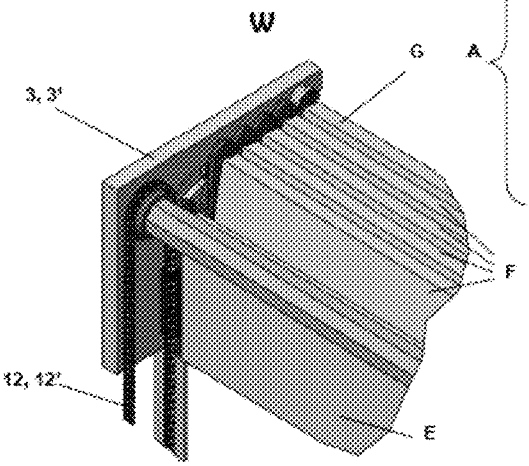
Fig.1.3
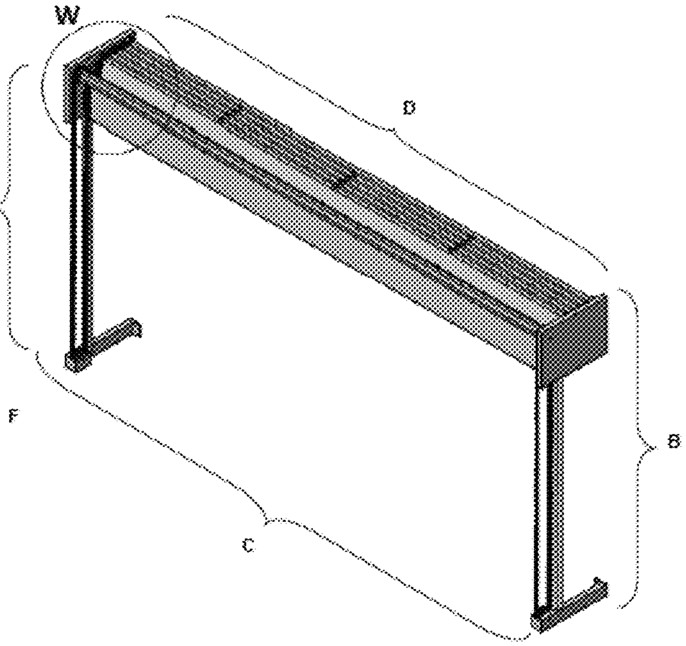
Fig.1.2

Fig.1a''
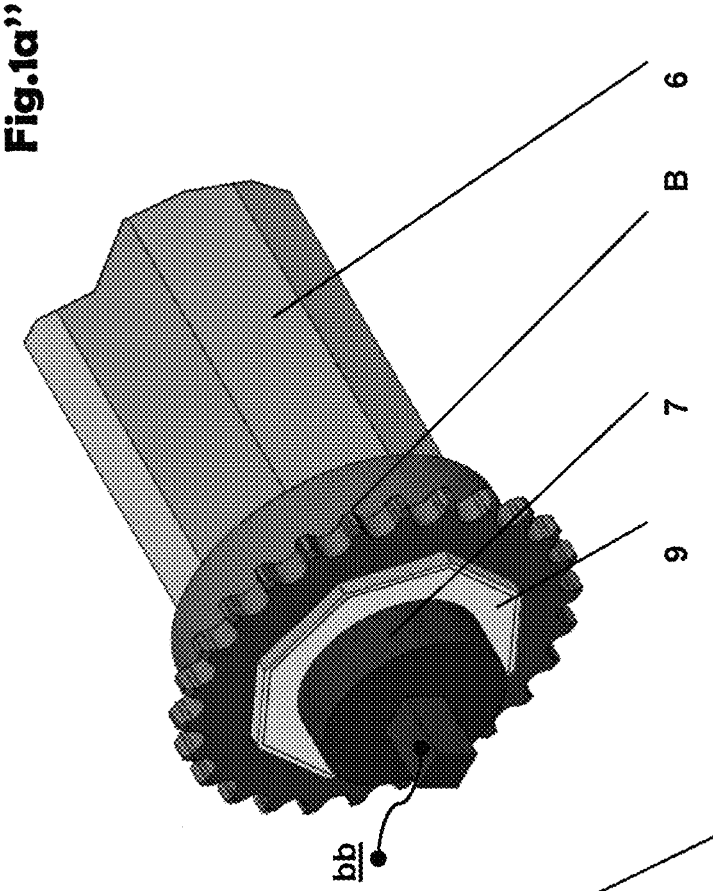
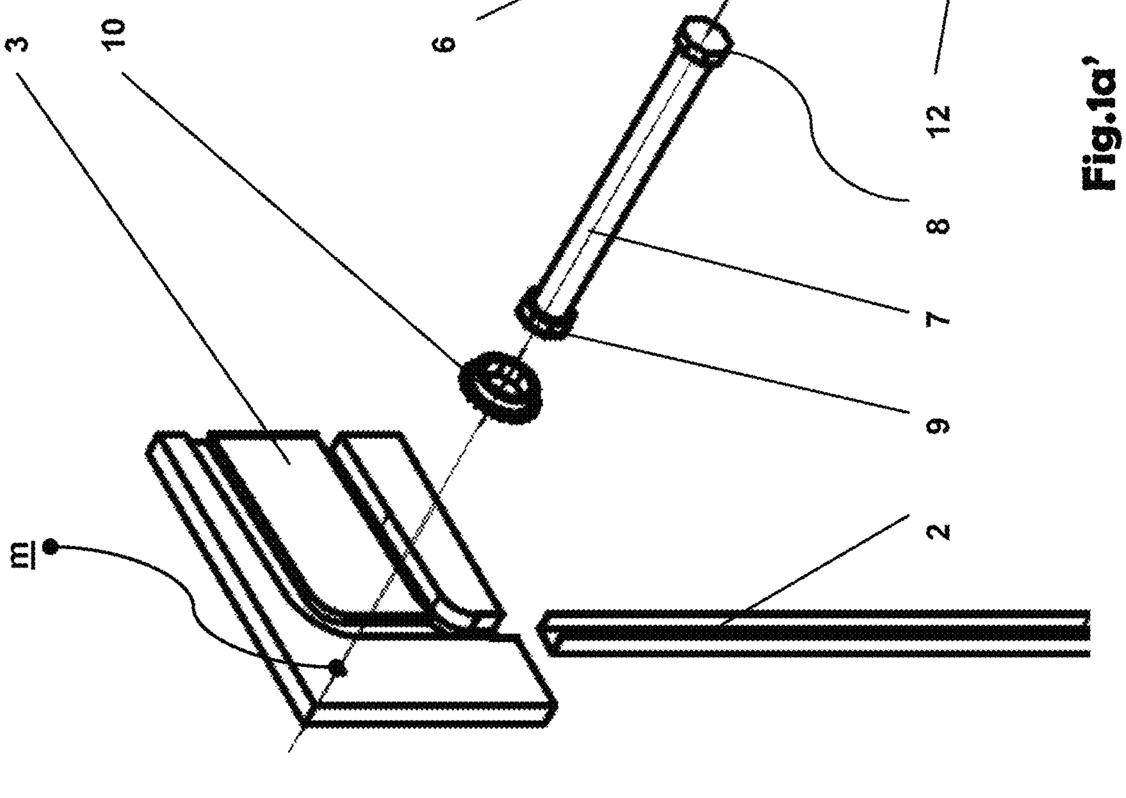
Fig.1a'

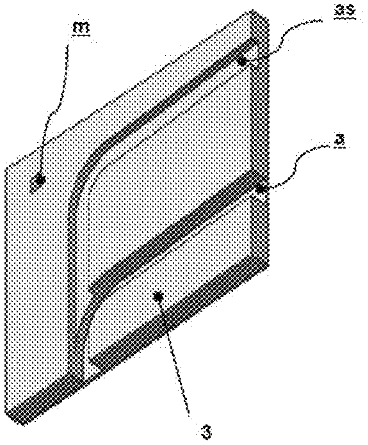
Fig.3.3
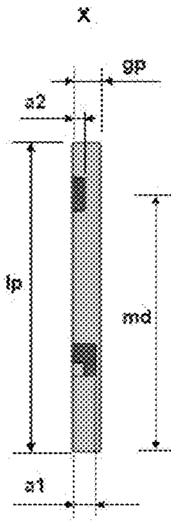
Fig.3.2
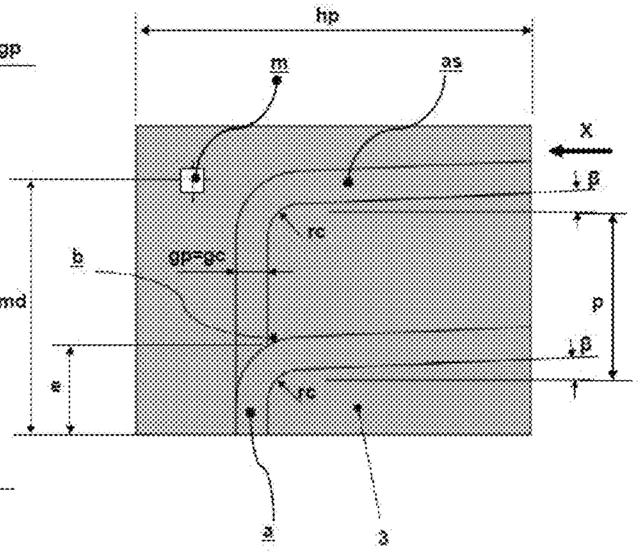
Fig.3.1

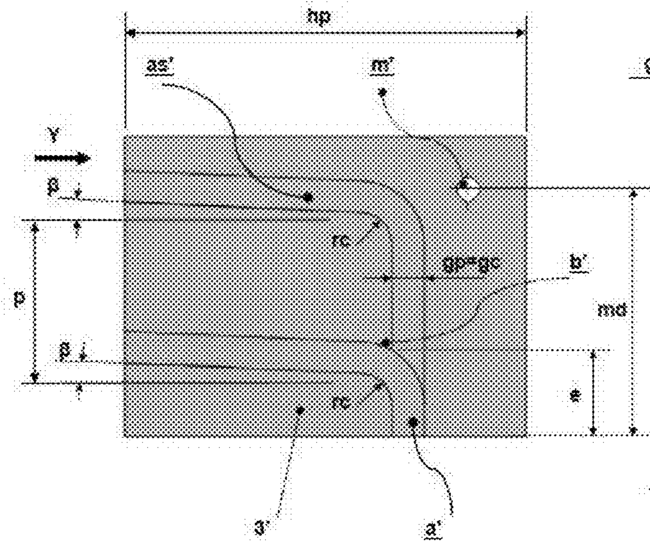
Fig.4.1
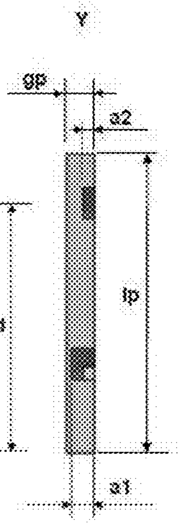
Fig.4.2
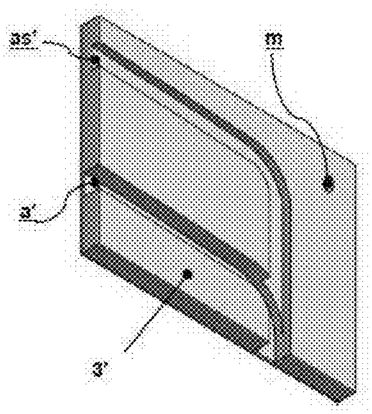
Fig.4.3

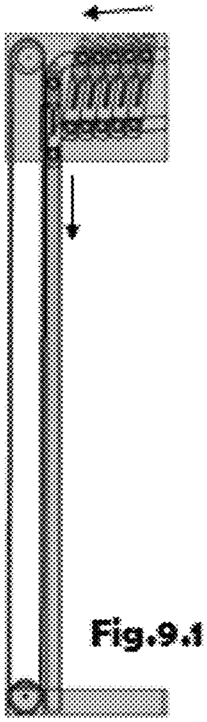
Fig.9.1
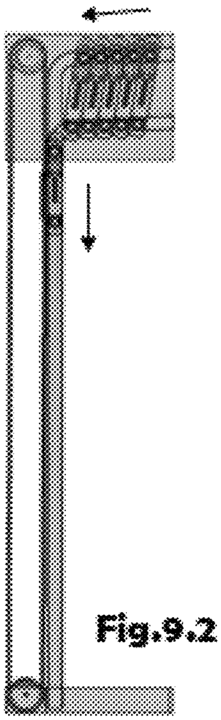
Fig.9.2
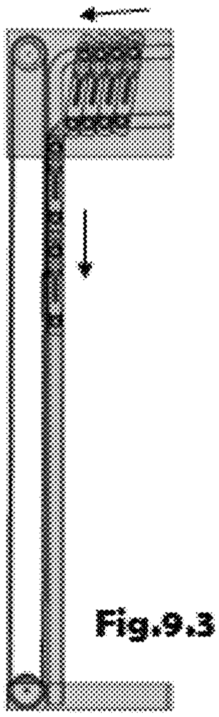
Fig.9.3
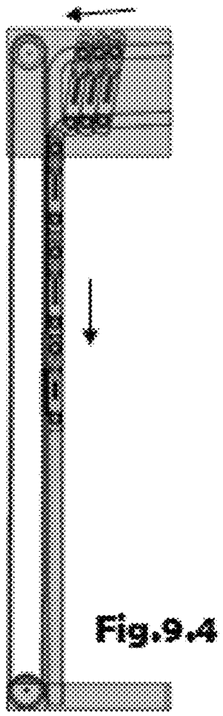
Fig.9.4
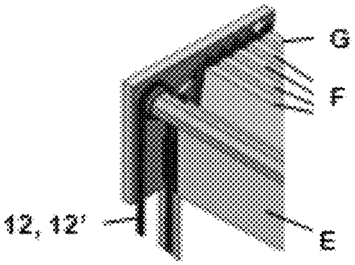
Fig.9.1'
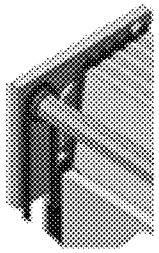
Fig.9.2
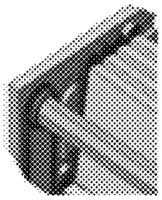
Fig.9.3'
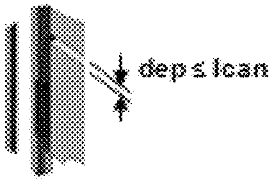
Fig.9.3'

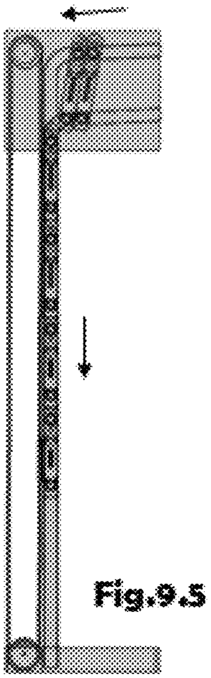
Fig.9.5
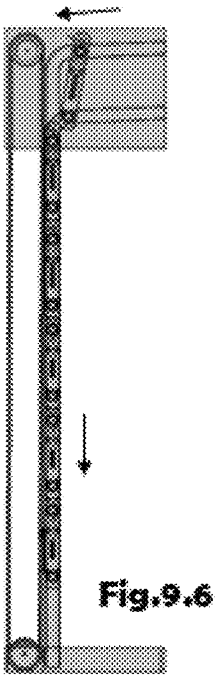
Fig.9.6
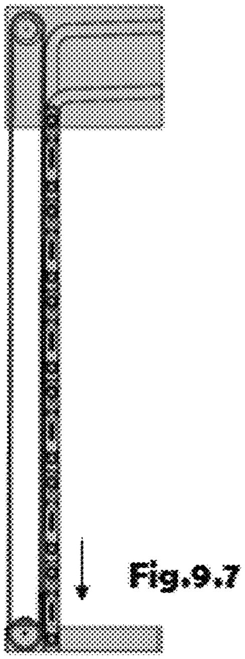
Fig.9.7
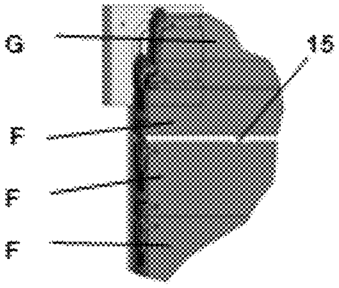
Fig.9.6'
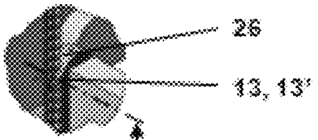
Fig.9.7'
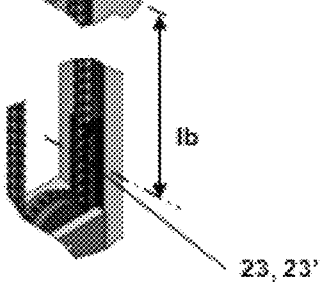
Fig.9.7''

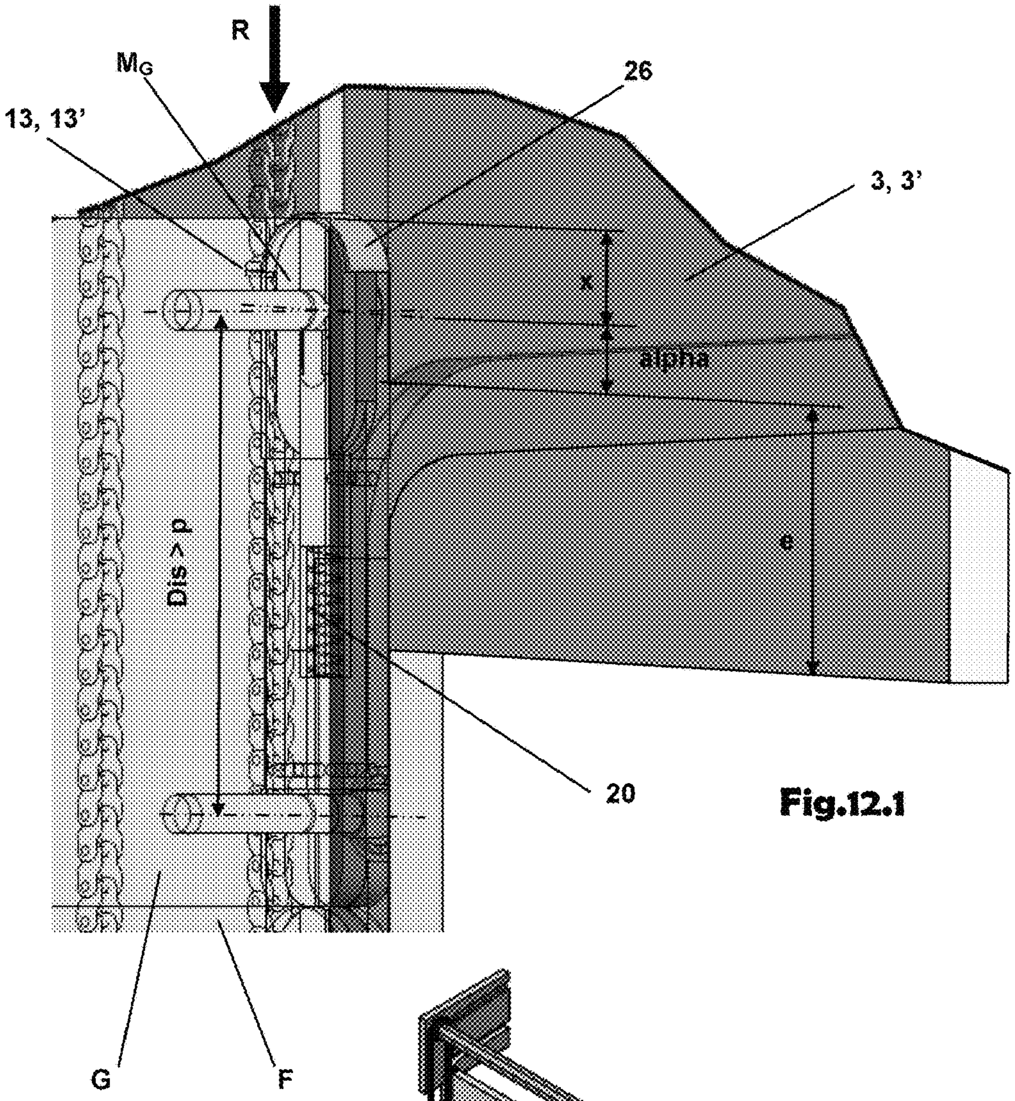
Fig.12.1
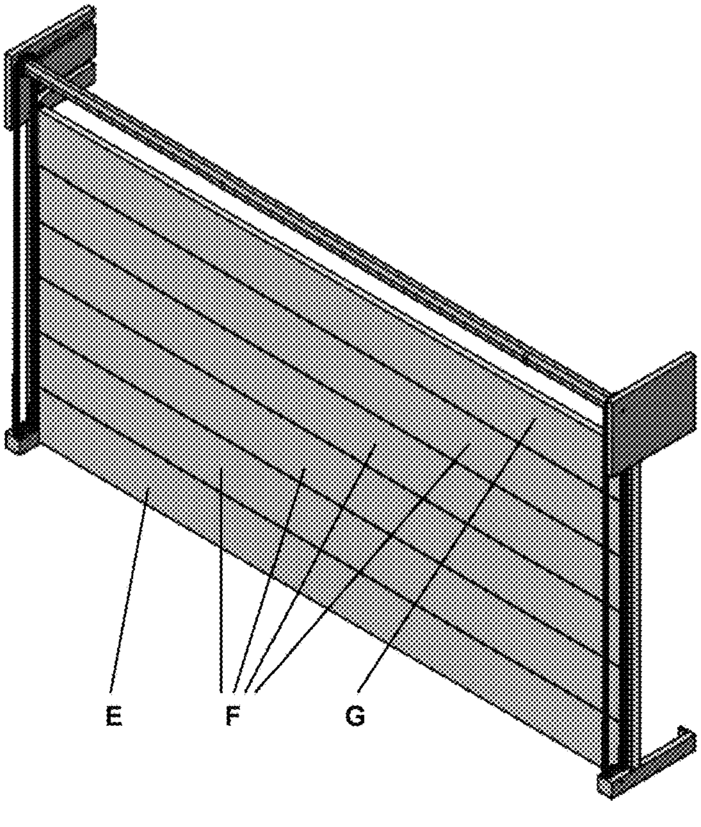
Fig.12.2

RETRACTABLE PARTITION WALL

RELATED APPLICATIONS

This application is the U.S. National Phase of and claims priority to International Patent Application No. PCT/R02019/000032, International Filing Date Dec. 26, 2019, entitled Retractable Partition Wall; which claims benefit of and priority to Romanian Patent Application No. a 2018 01146 filed Dec. 28, 2018; both of which are incorporated herein by reference in their entireties.

The field of this invention is a retractable wall that is used both for the partition of residential spaces and as a garage door.

A solution of partition of the rooms in residential apartments through glass partition walls already exists. It is an inner wall built of glass panels mounted on a wooden or metal framework. if has the disadvantage that, when open, it takes some of the useful space; moreover, it does not provide intimacy, as it does not offer soundproofing.

Another system of movable/removable partitioning wails is known, which is field of patent US2008209827 and is used to partition a room, including a wail component and some spaced-apart pressure feet—at the top of the wall—for pressing against a track positioned between the top of the wail and the ceiling and some additional spaced-apart pressure feet at the bottom of the wail for pressing against a track positioned between the bottom of the wall and the floor. This wail is positioned temporarily, securely and rigidly at a selected location in a room and, subsequently, it may be removed without substantial damage to the ceiling, floor or walls. There are some disadvantages of this wall system: i) it can only be used indoor; ii) installation and removal requires considerable time length: iii) additional storage space is needed after the components are folded and iv) if is not a soundproofing system.

Another horizontal garage door system is also known, which makes the scope of patent US2017328105. It consists of several panels that are connected pivotally to the adjacent side edges; the multiple panels are suspended on a top rail that includes a first straight portion, then a curved portion and a second straight portion. An electromotor is positioned at the first end of the first straight portion, a tensioning mechanism is positioned on a first panel and a gear mechanism is positioned at the second end of the first straight portion. A connecting band connects the electromotor, the gear mechanism and the tensioning mechanism to form a loop along the length of the top rail. The motor drives the connecting band so that the multiple panels move between a closed position, in which the panels are received substantially in the first straight portion, and an open position, in which the panels are received substantially in the second straight portion. The disadvantages of this system are the following: i) the garage opens by practically moving the panels that the door system is made of into a wall that is parallel to the wall of the space of the second straight portion, ii) the system does not offer soundproofing or thermal insulation.

Another garage door system is known that is made of horizontal panels that glide into two parallel guides through a system of springs and counterweights driver manually or electrically, the guides going forth on the ceiling of the garage, so that when the panels are lifted, they glide on the ceiling of the garage. The disadvantages of this solution are the following: i) the guides are visible permanently, both on the vertical walls and on the ceiling and additional unaesthetic storage space is required when the panels are retracted to the ceiling, ii) this solution cannot be adapted for indoor premises and il) the system is not soundproof.

It is also known a system, subject of the patent WO2012014245 (A1) for closing access openings or openings in general of residential and industrial buildings, with function of anti-effraction security, darkening, advertising, design, separation of environments, mobile walls, gazebos, verandas, as well as for furnishing of interiors, for closing wardrobes or cupboards or for walls of walk—in closets, etc., basically comprising a removable shutter or curtain constituted by a plurality of rigid slats or modular frames designed to slide along lateral guides and to be housed in a top head box, said system being characterized in that said slats or modular frames that make up the shutter are without elements of mutual constraint and are designed to be packed and stacked on one another in the head box by sliding first along said lateral guides and then passing into at least one pair of appropriately inclined top guides present in the head box itself; wherein the movement upwards of the slats or modular frames is obtained by means of a thrust that each slat or modular frame applies on the adjacent one above it starting from a bottom slat or raising end rail, which is moved upwards by purposely provided movement means, which are also designed to brake the movement of descent of said end rail—and of the slat overlying it—that occurs by gravity; said thrust between one slat or modular frame and the adjacent one taking place via contact surfaces purposely provided on their horizontal sides. Some disadvantages that this invention presents: i) the panels that form the wall enter and remain in contact with each other only by their own weight, and the processed rays on the longitudinal edges offer neither tightness nor sound protection; ii) due to the construction, the panels are in permanent contact, and in time, especially the wooden panels, show wear; iii) when stored in the upper part, as the invention is presented, the intermediate plates rub against each other, the outer surfaces deteriorating; the situation bothers both in the situation in which the system functions as a billboard, and in the situation in which it functions as an aesthetic interior wall.

It is also known the invention in the patent ES2235666 A1 presenting a shutter system and has the disadvantage that the panels are tightened together by a side flange, the movement of all panels being dependent on the movement of the first panel put into operation. The disadvantage of this technical solution is the impossibility of sealing the panels in the closed position.

It is also known the invention in the patent DE202006011746 U1 having the disadvantage that both the sliding of the panels vertically and their arrangement in the upper storage block is performed on grooved rails. The friction is considerable and the correct execution of the grooves is expensive.

It is also known the invention in the patent DE19505999 A1 presenting a horizontal panel storage system, by actuating only the lower panel, the others being raised by it. The main disadvantages are the lack of tightness and the permanent friction on the edges and faces at each drive.

The technical problems that this invention solves: a perfectly heat-shrinkable and antiphonic retractable wall, whose panels work independently of each other, without rubbing the outer faces of the panels and without rubbing the edges that come into contact during assembly.

The advantages of this invention are the following: whether it is used as an indoor wall, as an outdoor wail, or as a garage door, after installation, no additional storage space is required after the components are stacked: this is a soundproofing and thermal insulating system; after installation, it can either be operated by electronic control, or driven manually, its retracting or expanding only requiring minimal or no effort at all; a perfectly heat-shrinkable and antiphonic retractable wall, whose panels work independently of each other, without rubbing the outer faces of the panels and without rubbing the edges that come into contact during assembly.

Next, an example of execution of this invention is given also with reference to the following figures that represent:

FIG. 1 a perspective exploded view of the movable retractable wall

Figure 1B:
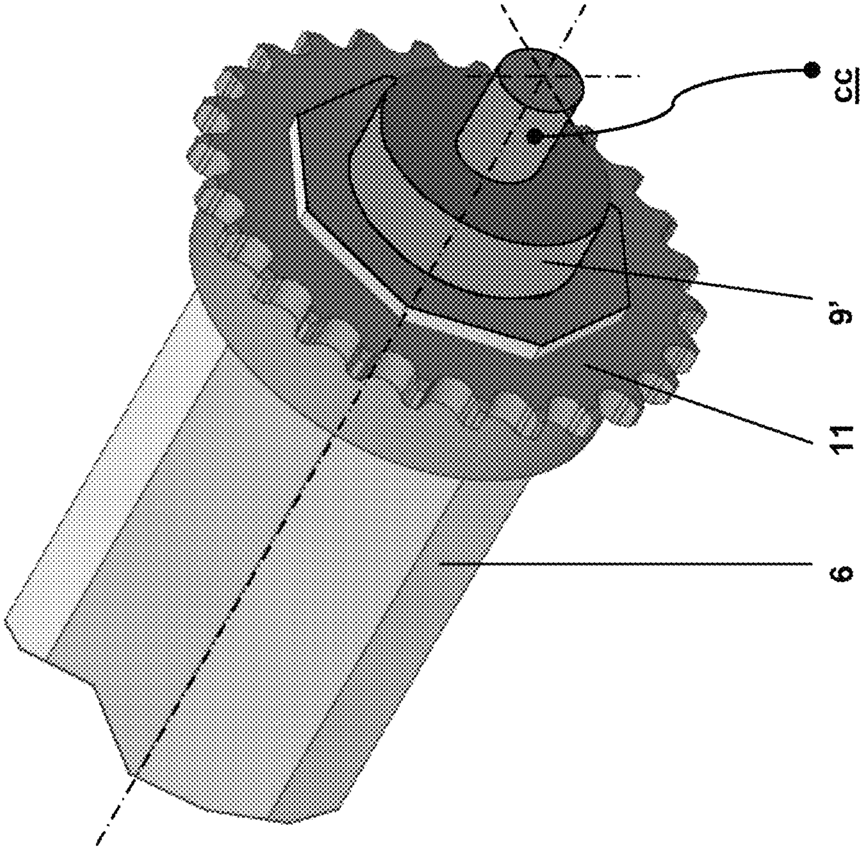
Figure 1B:
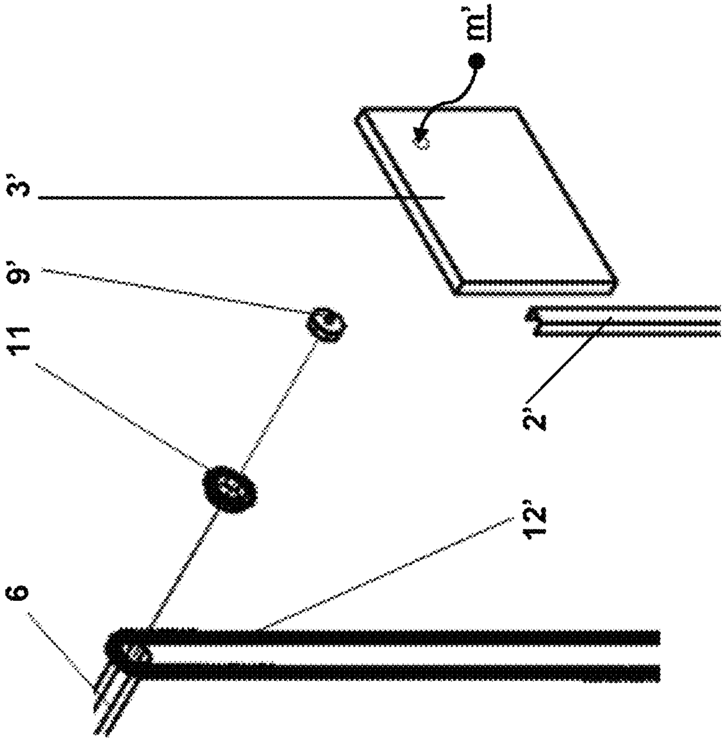
Figure 1C:
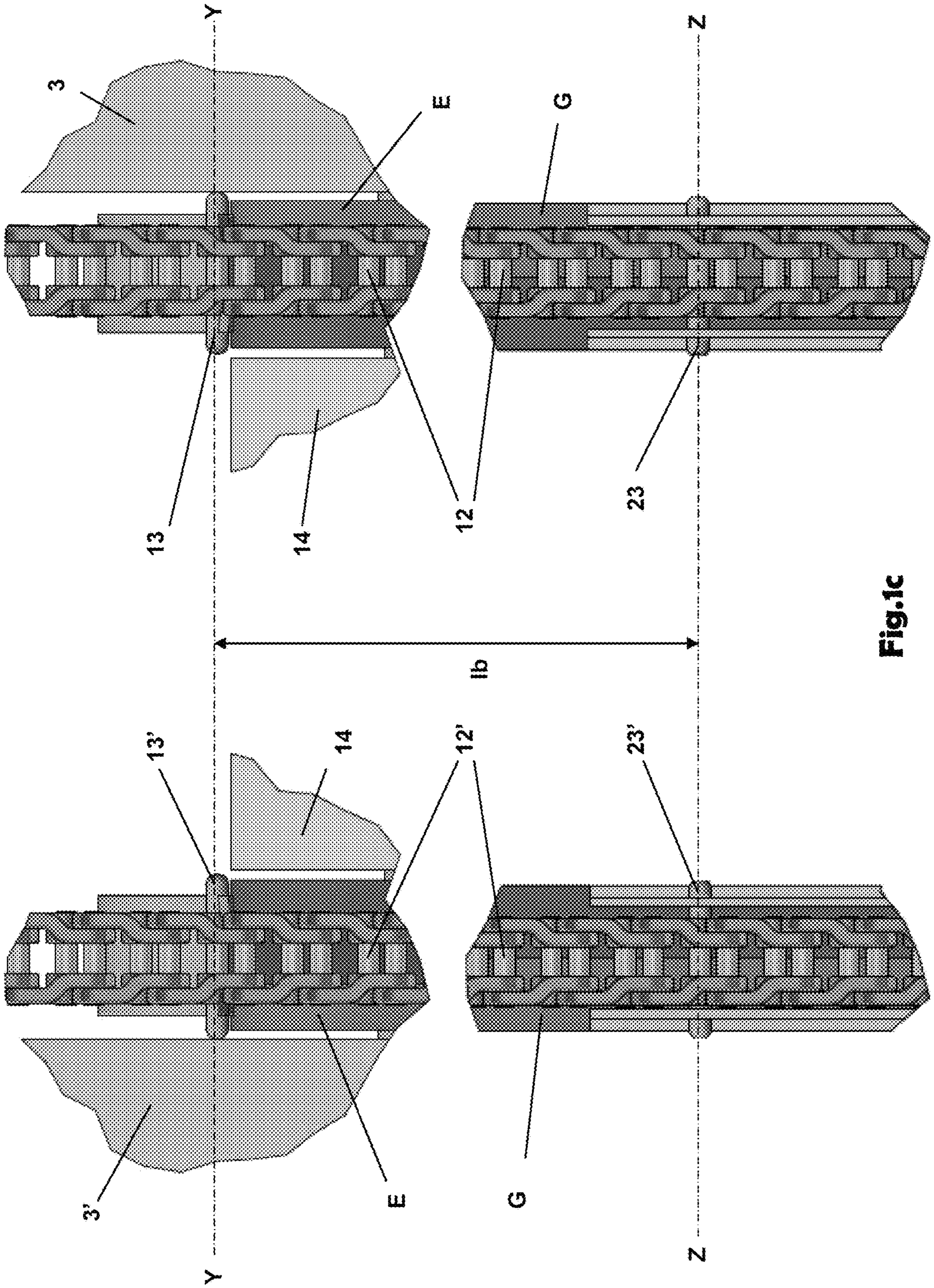

FIG. 1.2—a perspective isometric view of construction of the assembled retractable partition wail FIG. 1.3—a W presentation detail of the manner of stacking of the panels of the FIG. 1*a*'—an exploded isometric view of the conventionally right end of the driving unit FIG. 1*a*"—an assembled isometric view of the conventionally right end of the driving mechanism FIG. 1*b*'—an exploded isometric view of the conventionally left end of the driving unit FIG. 1*b*"—an assembled isometric view of the conventionally left end of the driving unit and FIG. 1*c*—an assembled isometric view of the Y-Y axis of the upper work driving arms, 13 and 13', and the Z-Z axis of the lower work driving arms, 23 and 23'

Figure 2A:
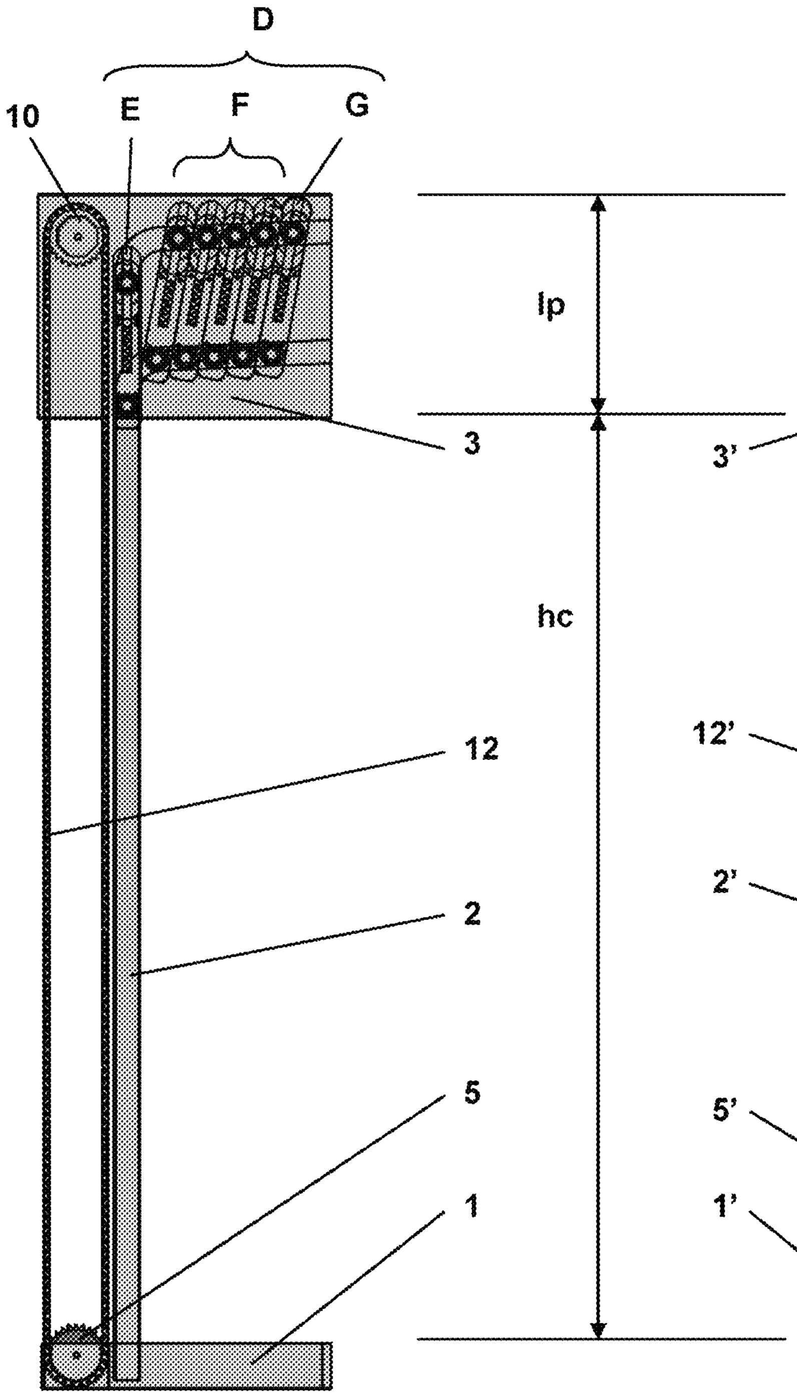

FIG. 2*a*—a front view of the assembled left-side runway

Figure 2B:
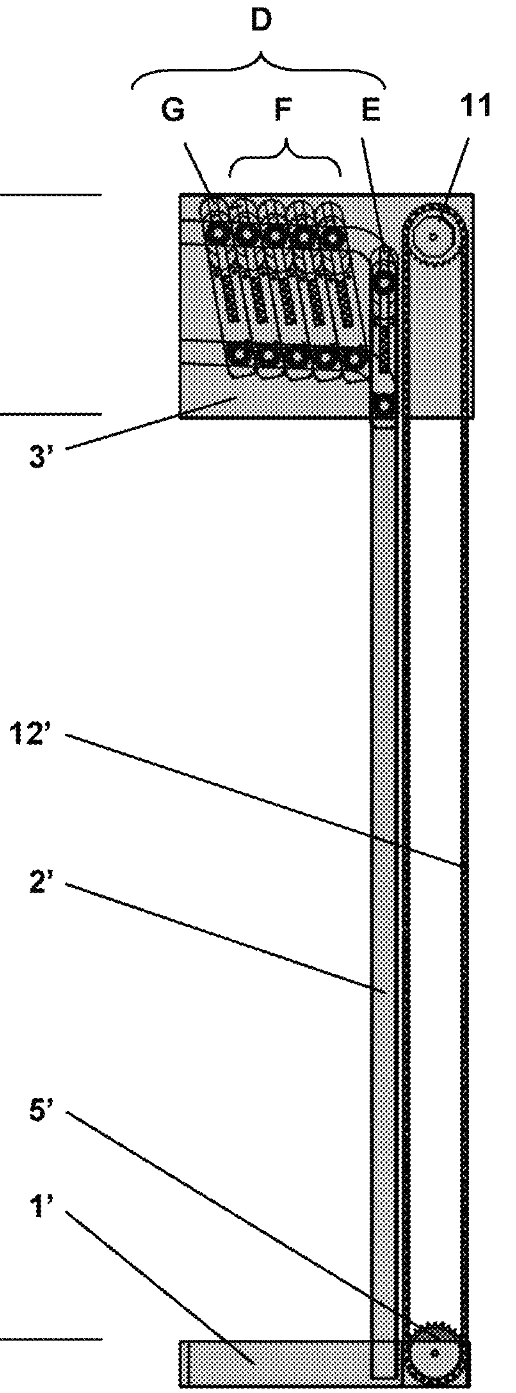
Figure 2A:
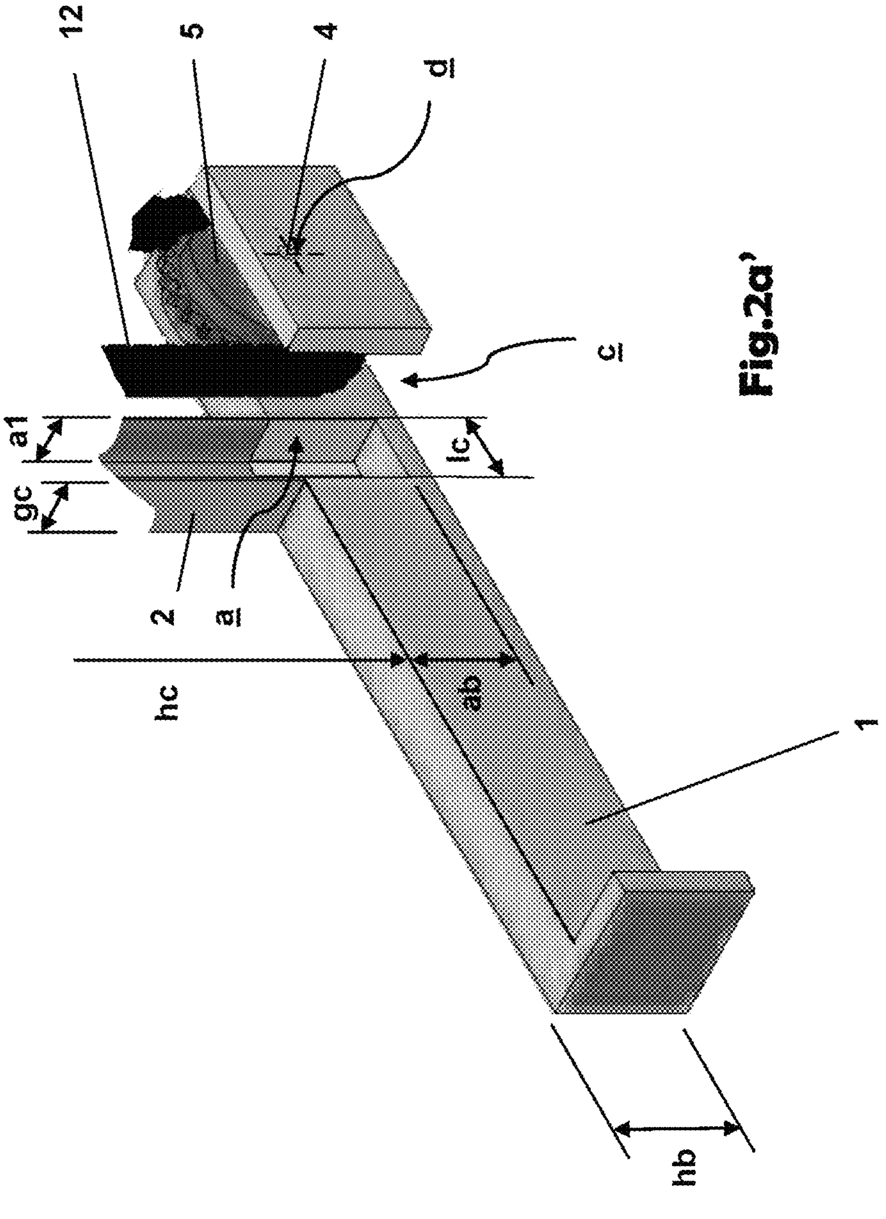
Figure 2B:
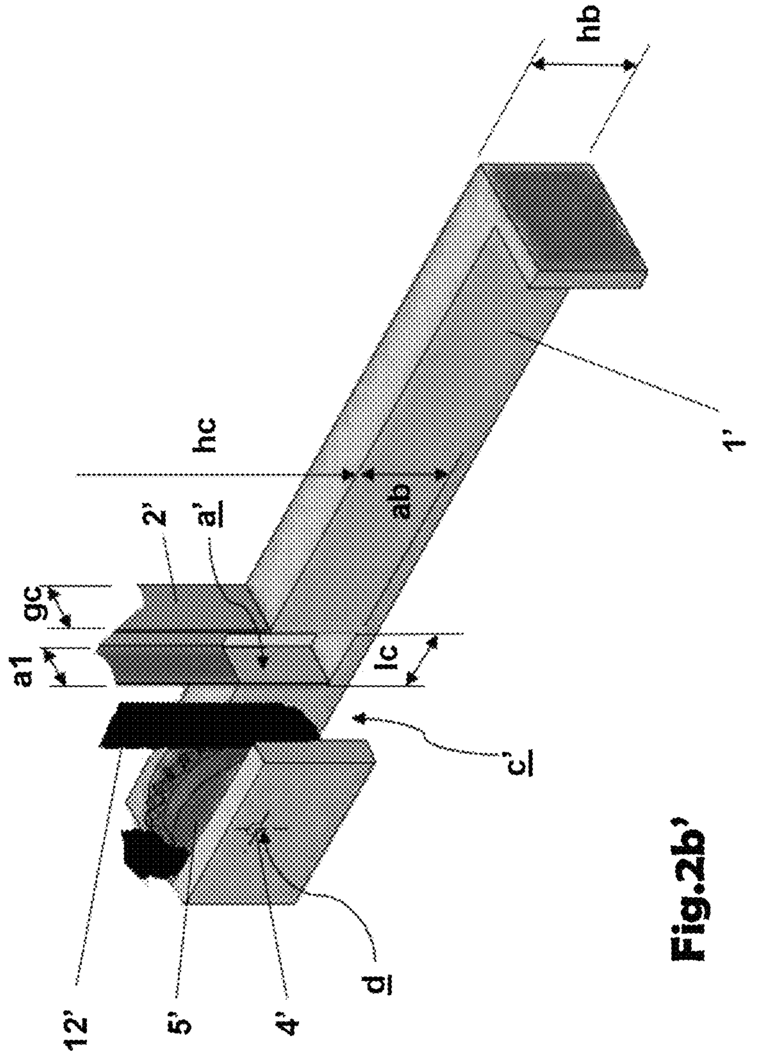

FIG. 2*b*—a front view of the assembled right-side runway

Figure 5:
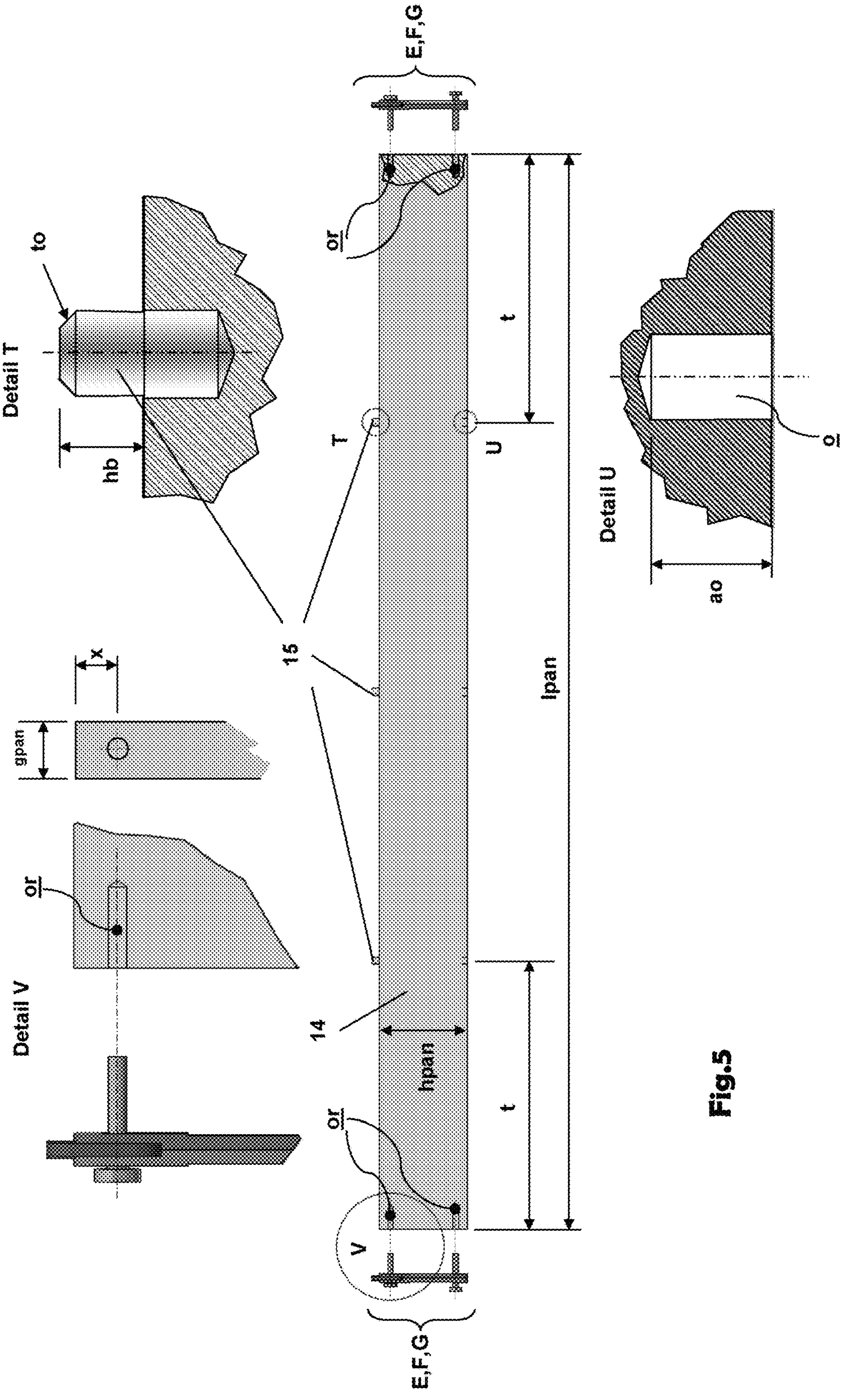
Figure 6:
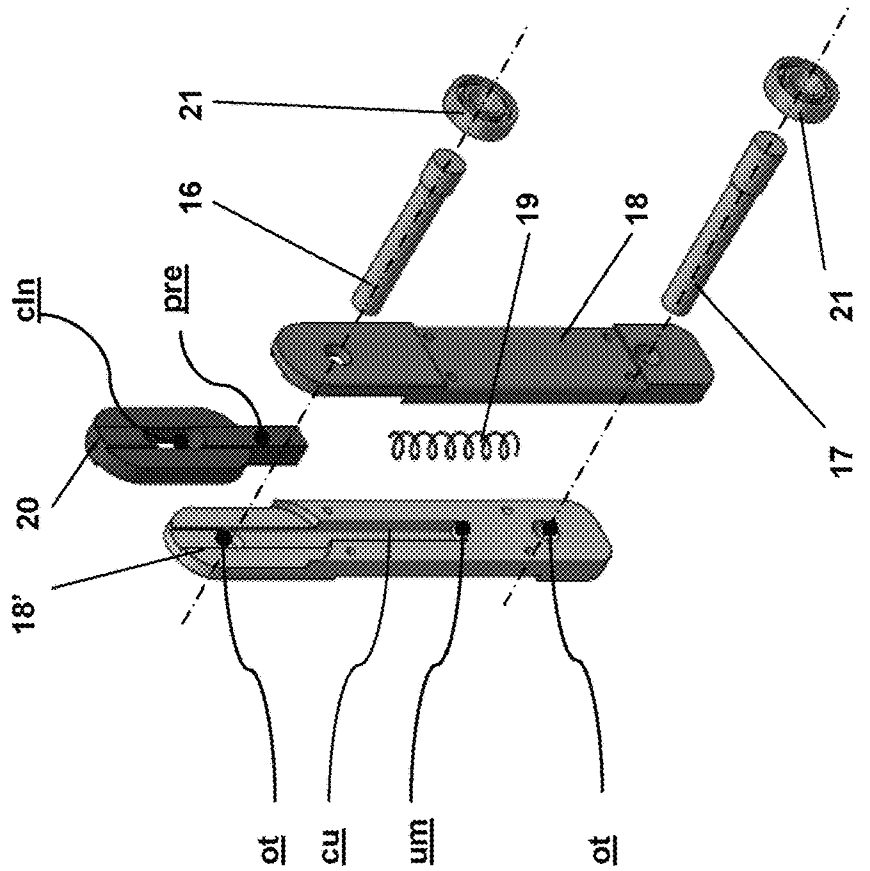
Figure 6:
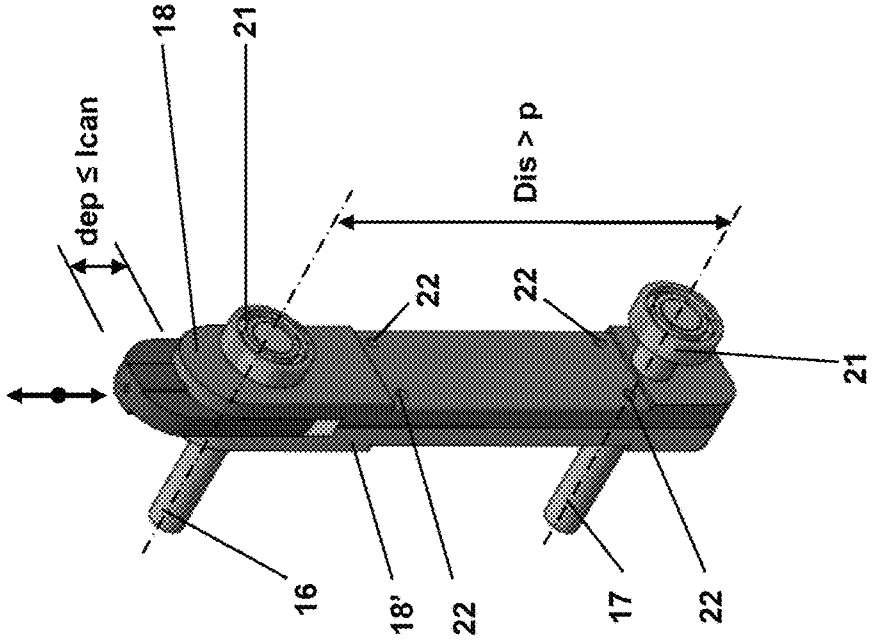
Figure 6:
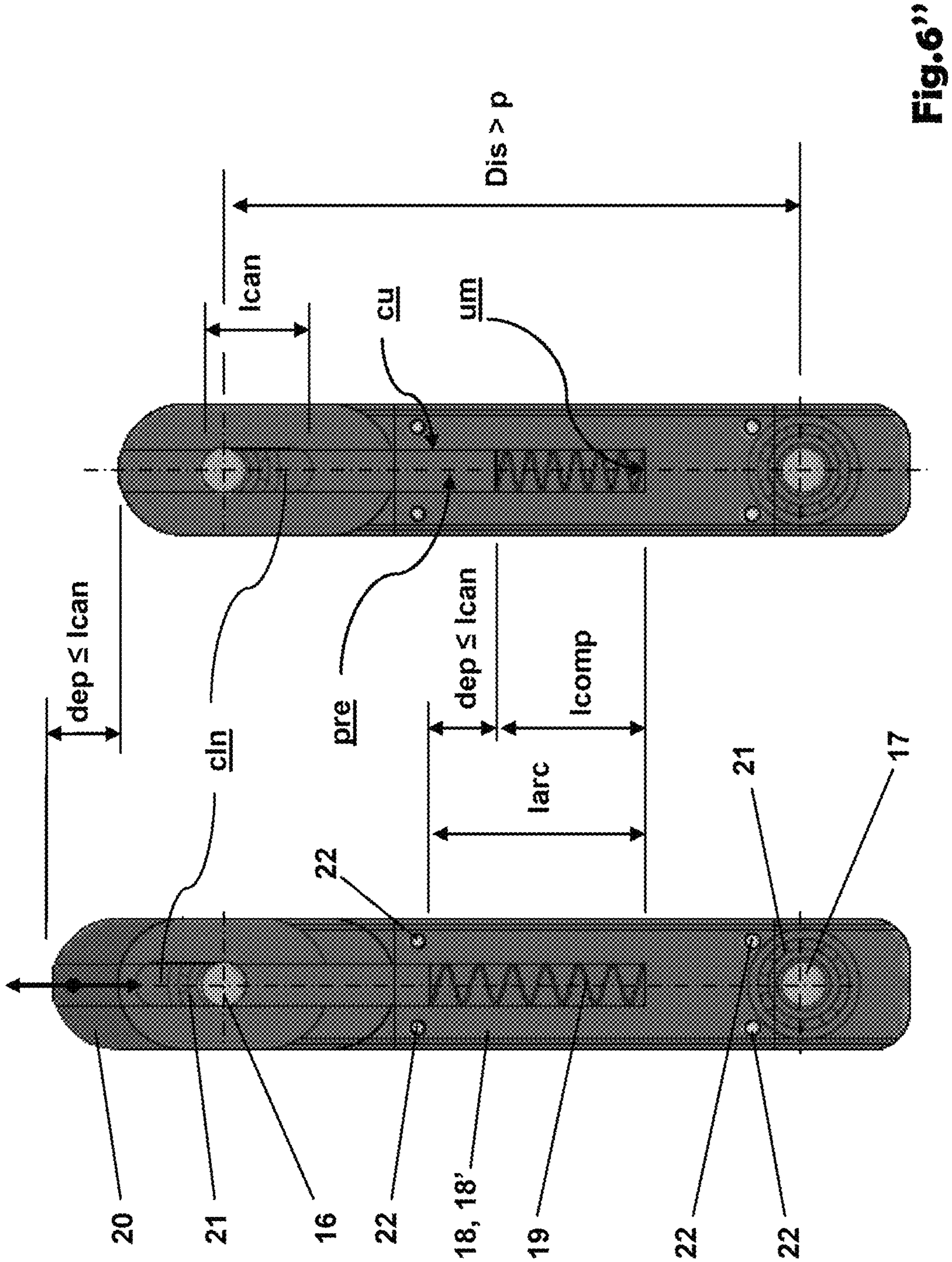
Figure 7:
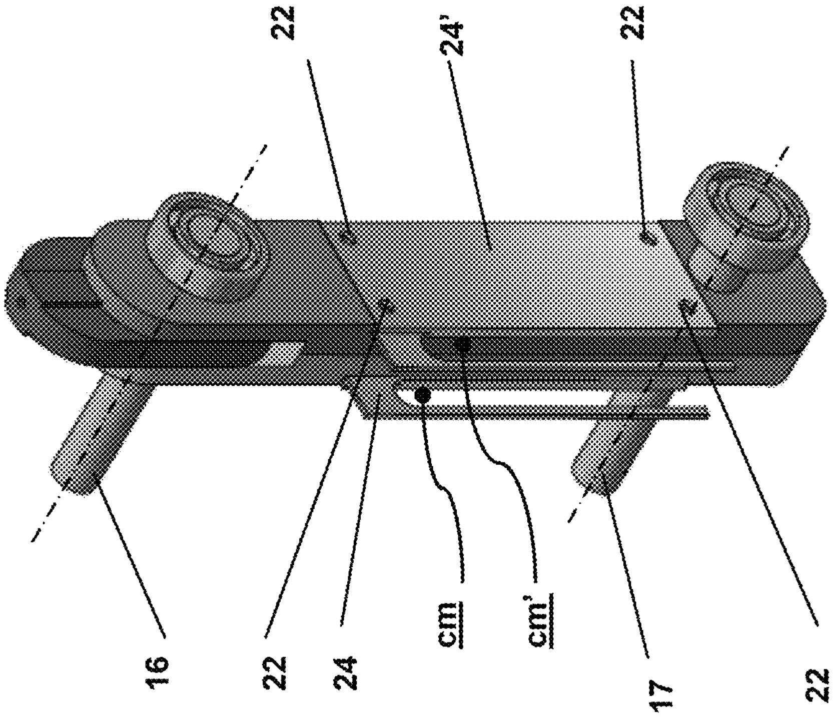
Figure 8:
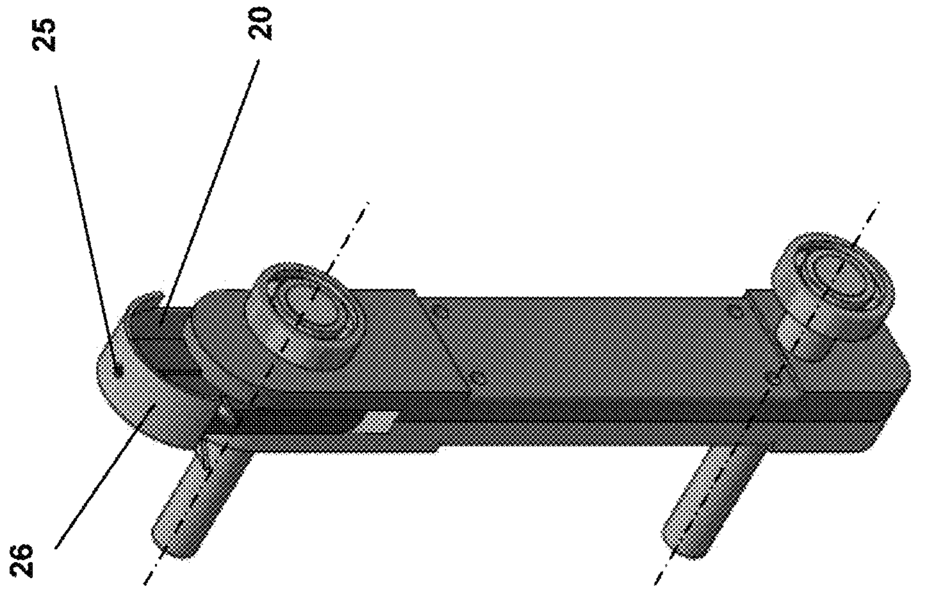
Figure 10:
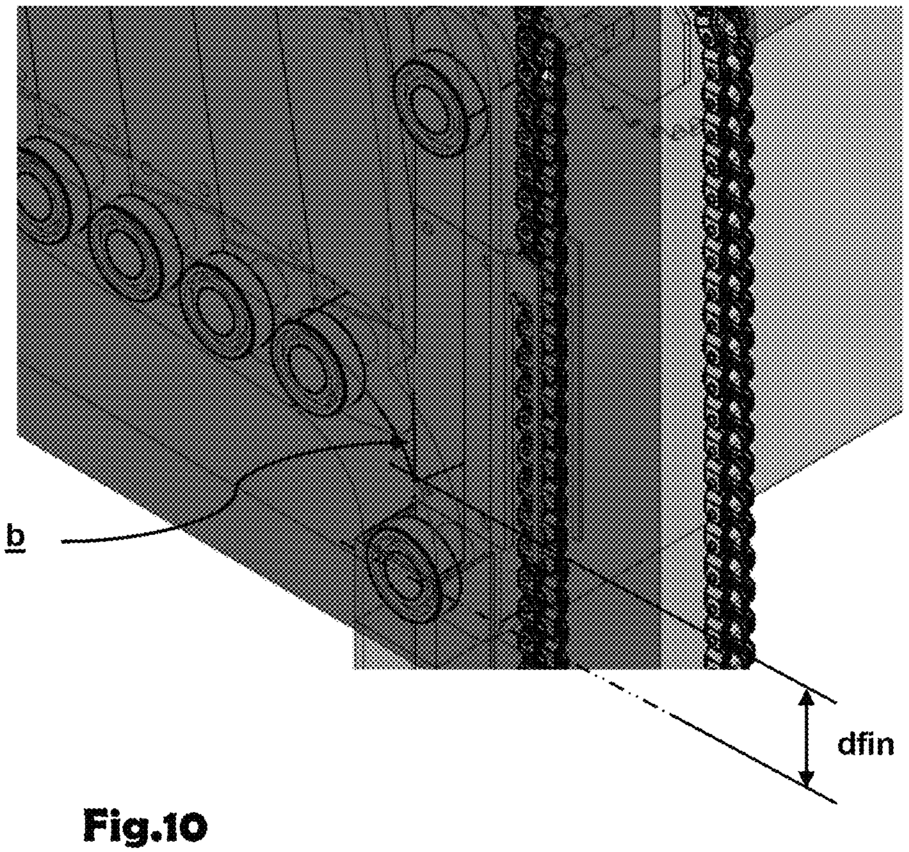
Figure 11:
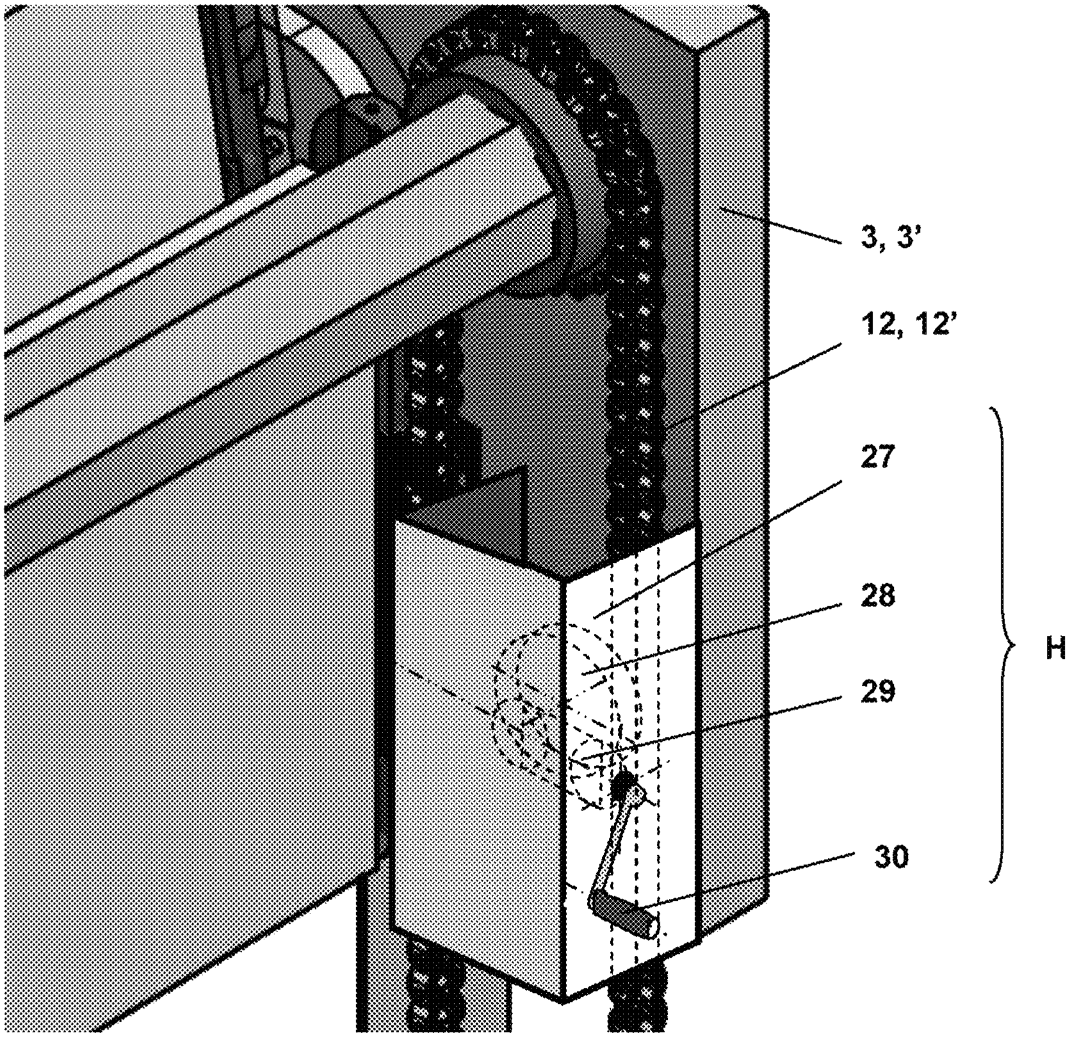

FIG. 2*a*'—an isometric view of the bridie of the assembled left-side runway FIG. 2*b*'—an isometric view of the bridle of the assembled right-side runway FIG. 3.1—a front view of the left-side storage panel FIG. 3.2—a X view of the left-side storage panel FIG. 3.3—an isometric view of the left-side storage panel to highlight the shape of the slots FIG. 4.1—a front view of the right-side storage panel FIG. 4.2—a Y view of the right-side storage panel FIG. 4.3—an isometric view of the right-side storage panel to highlight the shape of the slots FIG. 5—a view and details of the assembled intermediary panel FIG. 6, FIG. 6', FIG. 6"—an isometric view of the assembled intermediary distance module FIG. 7—an isometric view of the assembled bottom distance module FIG. 8—an isometric view of the assembled top distance module FIG. 9.1, FIG. 9.1', FIG. 9.2, FIG. 9.2', FIG. 9.3, FIG. 9.3', FIG. 9.4, FIG. 9.5, FIG. 9.6, FIG. 9.6', FIG. 9.7, FIG. 9.7', FIG. 9.7"—stages and details of the assembling FIG. 10—isometric detail of the modular panel when lifted completely FIG. 11—isometric detail of the manually driven mechanism FIG. 12.1—isometric detail of the upper part of the retractable wall when expanded to highlight the alpha >0 installation condition and FIG. 12.2—detail of the assembled movable panels consisting of an assembled lower panel, E, several assembled intermediary panels, F, and an assembled upper panel, G According to the invention, the vertical movable retractable wall vertical movable retractable wall system is mounted on two parallel walls of the premises and it consists FIG. 1, FIG. 1.2, FIG. 1.3) of an assembled left-side runway assembled left-side runway, A, that is fastened with the aid of the some known fastening elements, such as dowels and screws, on the conventionally left wall of the premises, an assembled right-side runway assembled right-side runway, B, mirroring the left-side runway, A, and which is fastened with some known fastening elements, such as dowels and screws, on the conventionally right-side wall of the premises, a drive mechanism drive mechanism, C, and several assembled movable panels, D; the assembled left-side runway assembled left-side runway, A, consists of (FIG. 2*a*, FIG. 2*a*') a left bridle, 1, fastened at the base of the conventionally left-side wall, a vertical runway, 2, of hc height, Ic width and gc thickness, with a slot, a, of a1<gc of depth, a vertical runway, 2, that lies on top of and is stuck to the left bridle, 1, and a left-side storage panel, 3, (FIG. 3.1, FIG. 3.2, FIG. 3.3), of hp height, Ip width and gp=gc thickness, stuck to the ceiling of the premises, on top of and going onward from the runway, 2, in which an F-shaped slot is made that, vertically and going forth from the bottom branch of the letter „F", continues the slot, a, of the vertical runway, 2, at the same depth, a1; the continuation of the vertical of the slot, a, and the top branch of the letter "F" is a slot, as, of the same width, gp, but having a a2<a1 depth;

The two slots that form the horizontal branches of the letter "F" connect to the vertical slot with a rc radius and continue under a slope of μ angle, also called "gravitational fall angle"; the vertical distance between the two slots is p;

We note with e the distance between the bottom edge of the left-side storage panel, 3, and the peak, b, between the upper part of the lower slot of the letter "F", of a1 depth, and the left side of the slot that continues with the a2 depth;

In the left bridle, 1, of hb height, the a slot of the vertical runway, 2, of a1 depth, continuing with the ab≤hb depth; the anterior end of the left bridle, 1, has a milled slot, c, and a hole, d, in which a sprocket wheel, 5, for Gall chain can be assembled on an axle, 4.

In the left-side storage panel, 3, on the vertical line lifted from the axis of the hole, d, in the left bridle, 1, a square orifice, m, has been made at the md distance from the lower side of the left-side storage panel, 3;

The assembled right-side runway, B, (FIG. 2*b*, FIG. 2*b*') mirroring the assembled left-side runway, A, is made of a right-side bridle, 1', fastened on the conventionally right-side wall, a vertical runway, 2', of hc height, Ic width and gc thickness, with a slot, a', of a1<gc depth, a vertical runway, 2', that lies on top of and is stuck to the left bridle, 1, and a left-side storage panel, 3', (FIG. 4.1, FIG. 4.2, FIG. 3.3), of hp height, Ip width and gp=gc thickness, stuck to the ceiling of the premises, on top of and going onward from the runway, 2', in which a "reversed F-shaped" slot is made that, vertically and going forth from the bottom branch of the letter „F", continues the slot, a', of the vertical runway, 2', at the same depth, a1; the continuation of the vertical of the slot, a', and the top branch of the "reversed letter F" is a slot, as', of the same width, gp, but having a a2<a1 depth;

The two slots that form the horizontal branches of the "reversed letter F" connect to the vertical slot with a rc radius and continue under a slope of μ angle, also called "gravitational fall angle"; the vertical distance between the two slots is p;

We note with e the distance between the bottom edge of the right-side storage panel, 3', and the peak, b', between the upper part of the lower slot of the "reversed letter F", of a1 depth, and the left side of the slot, as', that continues with the a2 depth;

In the right bridle, 1', of hb height, the a' slot, of a1 depth of the vertical runway, 2', continuing with the ab≤hb depth: the anterior end of the left bridle, 1', has a milled slot, c', and there is a hole, d', in which a sprocket wheel, 5', for Gall chain, identical to the sprocket wheel 5, can be assembled on an axle, 4'.

In the right-side storage panel, 3', on the vertical line lifted from the axis of the hole, d', in the right bridle, 1', a square orifice, m', has been made at the md distance from the lower side of the right-side storage panel, 3';

The driving unit, C (FIG. 1*a*', FIG. 1*a*'', FIG. 1*b*', FIG. 1*b*'', FIG. 2*a*', FIG. 2*b*', FIG. 5) consists of a polygonal tube, 6, for example an octagonal one, in which,

- Through the conventionally left end, a special motor, 7, is inserted, that, at the right end, has a polygonal-headed axle, for example an octagonal one, 8, that slides into the tube, 6, as far as a limiting impression, u, made on the tube: after the motor, 7, is inserted, at the conventionally left end of the tube, 6, a distance piece, 9, is glided in, which, on the outside, has the section of the tube, 6, and on the inside, has the exterior diameter of the motor, with a little clearance; a sprocket wheel for Gall chain, 10, is assembled on the distance piece, 9; a head, bb, of the same section as that of the square orifice, m, is placed axially on the encasing as the left end of the motor, 7; the orifice, m, is processed in the left-side storage panel, 3;
- At the conventionally right end of the tube, 6, a distance piece, 9, is glided in, which, on the outside, has the section of the tube, and, at the free end, axially, has a cylindrical head, cc, of the same section as that of the cylindrical orifice, m', processed in the right-side storage panel, 3'; on the distance piece, 9', a sprocket wheel for Gall chain, 11, is assembled;
- On the sprocket wheel for Gall chain, 10, and the sprocket wheel for Gall chain, 5, an endless Gall chain, 12, is assembled; on the side facing the runway, 2, the Gall chain, 12, has an upper work driving arm, 13, and a lower work driving arm, 23, both placed at an Ib distance;
- On the sprocket wheel of the Gail chain, 11, and the sprocket wheel of the Gall chain, 5', an endless Gall chain, 12', is assembled; on the side facing the runway, 2', the Gall chain, 12', has an upper work driving arm, 13', and a lower work driving arm, 23', both placed at an Ib distance;
- In the assembly, the Y-Y axis of the upper work driving arm, 13, is the same as the axis of the upper work driving arm, 13' (FIG. 1*c*')
- In the assembly, the Z-Z axis of the lower work driving arm, 23, is the same as the axis of the lower work driving arm, 23'

The assembled movable panels, D (FIG. 2*a*, FIG. 2*b*), consist of an assembled lower panel, E, several assembled intermediary panels, F, and an assembled upper panel, G;

The assembled intermediary panel, F, (FIG. 5, FIG. 6, FIG. 6', FIG. 6'') consists of a panel, 14, of Ipan length, hpan height and gpan thickness, which, both in the upper and the lower part, both at a t distance from both edges and in the middle, has an unfair hole, o, of ao depth; it is only in the orifices on the upper part of the panel that some orientation bolts, 15, can be assembled, which are made so that some of them may be bound in the orifices on the upper part of the panel, 15, whereas on the free side of hpan height, with the help of an orientation bevel, to, some may be guided and slide into the unfair holes, o, of ag>bh depth, on the lower part of the next panel, when such a panel exists; laterally, on either side of each panel, F, at the x distance (FIG. 5) from the edges on the hp height, there are two orifices, or, in which some bolts, 16 and 17, of an assembled intermediary distance piece, M, are inserted without any clearance; when assembled, the assembled intermediary panel, E, with the assembled intermediary modules, $M_E$, to the left and to the right of the panel, 14, may slide on the bearings, 21, on the short bolts, 16, along the as and as' slots, of a2 depth, and respectively with the bearings, 21, on the long bolts, 17, along the a and a' slots, of a1 depth;

The assembled lower panel, E, differs from the assembled intermediary panel only in that it has an assembled lower distance piece $M_E$ (FIG. 7) at its ends;

The assembled upper panel, G, differs from the assembled intermediary panel only in that it has an assembled lower distance piece $M_G$ (FIG. 8) at its ends;

The assembled intermediary distance piece ($M_F$) (FIG. 6, FIG. 6', FIG. 6'') consists of two symmetrical lateral elements (18 and 18') of Lmd length, Imd>gpan width, a compression spring (19), which, when uncompressed, has the Iarc length, and, when compressed, has the Icomp length, a slide block (20), a short bolt (16), on which a bearing (21) is fastened, and a long bolt (17) on which another bearing (21) is fastened; each of the symmetrical elements (18 and 18') have some orifices (ot), a gliding slot (cu), that ends at a shoulder (um); the slide block (20) has a longitudinal slot (cln) of Ican length and of a width equal to the diameter of the short bolt (16) and an extension (pre) that is worked in such manner that, during assembly, the glide block (20) glides into the gliding slot (cu) under the action of the spring (19); the assembled lateral symmetrical elements (18 and 18'), compression spring (19) and glide block (20) are fastened with some screws (22); the bolts (16 and 17) are assembled through the orifices (ot) and, on these bolts, the bearings (21) are assembled without any clearance;

The assembled lower distance piece ($M_E$) (FIG. 7) differs from the assembled intermediary distance piece ($M_F$) in that has two identical and mirroring small face plates (24 and 24') assembled between the bolts (16 and 17), with the screws (22), both plates having a drive slot in them (cm, respectively cm);

The assembled upper distance piece ($M_G$) (FIG. 8) differs from the assembled intermediary distance piece ($M_F$) in that a coupler jaw (26) is assembled on the sliding block (20) with a screw bolt (25);

In a second version, the driving unit, C, is completed by a manual driving mechanism, H, (FIG. 17) that would be necessary in case the motor, 7, stops working due to a power failure; the manual driving mechanism, H, is mounted, for example, on one of the storage panels, 3 or 3', and it consists of a box, 27, in which a Gall chain sprocket wheel, 28, is engaged together with the Gall chain, 12 or 12', and laterally with a conveyer worm, 29, fastened on the box, 27, and driven by a lever, 30. The manual drive mechanism, H, is disengaged as long as the motor drive, 7, operates; when the manual drive, H, is preferred, the motor, 7, has to be disengaged.

In a third version, the driving unit, C, is only actuated by the manual driving mechanism, H.

Manner of assembly (FIG. 9.1, FIG. 9,7', FIG. 9.2, FIG. 9.2', FIG. 9.3, FIG. 9.3', FIG. 9.3'', FIG. 9.4, FIG. 9.5, FIG. 9.6, FIG. 9.6', FIG. 9.7, FIG. 9.7', FIG. 9.7''):

- In the initial stage, the assembled left-side runway, A, the assembled right-side runway, B and the driving unit, C, are mounted in the premises—on the walls, columns etc.; the special engine, 7, not being on load, the polygonal-headed axle rotates freely; the Gall chains, 12 and 12', are assembled on the wheels, 10 and 5, respectively 11 and 5', so that the lower work driving arms, 23 and 23', are in the proximity of the Gall chain sprocket wheels, 10 and respectively 11, on the side facing the 2 and respectively 2' runways;

In the second stage, simultaneously, through the two slots that make the horizontal branches of the letter "F" in the storage panels 3 and 3', the assembled lower panel, E, is inserted: both on the left-side storage panel, 3, and the right-side storage panel, 3', the bearings, 21, on the long bolt, 17, are first inserted in the slot a, then the bearings, 21, on the short bolt, 16, are inserted in the slot as; owing to the fact that Dis>p (FIG. 6", FIG. 3.1, FIG. 4.1), the assembled lower panel, E, will have an oblique position; owing to the p gravitational fall angle of the runways in the two storage panels, 3 and 3', the assembled lower panel, E, will slide along the slots and will fix the lower work driving arms, 23 respectively 23', in the drive slots, cm, respectively cm', of the small face plates, 24 and 24', which will glide freely in the slots, cm and respectively cm': the assembled intermediary panels, F, are inserted one by one, in the same manner and, at the end, the assembled upper panel, G, is inserted (FIG. 2*a*, FIG. 2*b*);

In the third stage, by letting the assembled lower panel, E, glide freely, through its own weight, in the vertical runways, 2 and respectively 2', as soon as the downward movement of the assembled lower panel, E, allows it, the first assembled intermediary panel, F, positions itself by gliding with the two assembled intermediary distance pieces, $M_F$, at the ends, on the sliding blocks, 20, of the assembled lower panel, E; owing to the springs, 19, the sliding blocks, 20, keep the assembled intermediary panel, F, away from the orientation bolts, 15, that are assembled in the upper part of the assembled lower panel, E, (FIG. 5 and FIG. 6") at the Lmd+dep>hp+hb distance;

As soon as the downward movement of the first assembled intermediary panel, F, allows it, the next, assembled intermediary panel, F, positions itself, by gliding with the two assembled intermediary distance pieces, $M_F$, at the ends, on the sliding blocks, 20, of the assembled lower panel, E; owing to the weight of the two previous panels, the first assembled intermediary panel, E, enters, with the unfair holes, o, in the orientation bolts, 15, that are assembled on the upper part of the previous panel: but, owing to the springs, 19, of the previous assembled distance piece, the sliding blocks, 20, keep the next assembled intermediary panel, F, away from the orientation bolts, 15, that are assembled in the upper part of the previous assembled panel, at the same Lmd+dep>hpan+hb distance;

When the assembled upper panel, G, gets in vertical position, the special motor, 7, starts and, through the assembly of pieces of the driving unit, C, actuates the Gall chains, 12 and 12', and the upper work driving arms, 13 and respectively 13', thus coming into contact with and pushing down, on the F direction (FIG. 12.1), the coupler jaws, 26, of the assembled upper distance piece, $M_G$, to the point where the springs, 20, of this last distance piece are completely compressed, to ensure i) the orientation of the assembled upper panel, G, in the orientation bolts, 15, of the one before last panel and ii) the tightening of the entire retractable wall, while complying with the alpha>0 (at least 2-3 cm) condition (FIG. 12), so that the last bearing does not come out from the vertical part of the slot, as and as', in the storage panels, 3 and 3', in other words the vertical part of e size of the slot, a and a'; in this position, between the work driving arms, 23 and respectively 23', and the shoulder of the cm and respectively c' slots of the small face plates, 24 and 24', a clearance of a few centimetres remains, and the motor, 7, stops through electronic command:

For the retracting of the modular wall, the engine, 7, is turned on, the Gail chains, 12 and 12', are actuated simultaneously, the upper work driving arms, 13 and 13', stop pushing onto the coupler jaws, 26, of the assembled upper distance piece, $M_G$, releasing the springs, 19, and thus allowing the sliding block, 20, to move the assembled upper panel, F, which goes out of the orientation bolts, 15; the lower driving arms, 23 and 23', get to the shoulders of the drive slots, cm and respectively cm', and then drive all the above panels in an upward movement;

when the assembled upper panel, G, enters the left-side storage panel, 3, and right-side storage panel, 3', the next assembled intermediary panel, F, in its turn, comes out of the orientation bolts, 15, of the intermediary panel underneath it, thus being able to enter the left-side, 3, and right-side, 3', storage panels;

the upward retracting of all the panels in the upper part of the wall ends when the bearings, 21, on the long bolts, 17, of the assembled lower panel, E, reach the dfin>0 distance from the peak, b, between the upper part of the lower slot of the letter "F" of the left-side storage panels, 3, and right-side storage panels, 3', (FIG. 1, FIG. 1.2, FIG. 1.3, FIG. 10).

BIBLIOGRAPHY patent US2017328105
patent US2008209827
patent JP2004278060
patent WO2012014245 (A1)
patent ES2235666
patent DE202006011746
patent DE19505999 A1

The invention claimed is:

1. A retractable partition wall comprising: a removable shutter having a plurality of assembled panels (E, F, G) designed to slide along lateral guides (2, 2') using a motor (7), which, when retracted, the plurality of assembled panels (E, F, G) have an aspect of a horizontal beam attached to a ceiling, whereas when expanded the plurality of assembled panels (E, F, G) operate as a wall, said retractable partition wall being characterized in that said retractable partition wall comprises an assembled left-side runway (A), that is fastened with an aid of fastening elements comprising dowels and screws, on a left-side wall of premises, an assembled right-side runway, (B), mirroring the assembled left-side runway (A), and which is fastened with fastening elements comprising dowels and screws, on a right-side wall of the premises, a drive mechanism (C) and the plurality of assembled panels (E, F, G); the assembled left-side runway (A) comprising (FIG. 2*a*, FIG. 2*a'*) a left bridle (1) of hb height, fastened at a base of the left-side wall, a vertical runway (2) of hc height, Ic width and gc thickness, with a slot (a) of a1<gc of depth, the vertical runway (2) lies on top of and is attached to the left bridle (1), and a left-side storage panel (3) (FIG. 3.1, FIG. 3.2, FIG. 3.3), of hp height, Ip width and gp=gc thickness, attached to the ceiling of the premises, on top of and going onward from the runway (2); in the left bridle (1), the slot (a), of a1 depth, of the vertical runway (2) continuing on for a depth ab≤hb an anterior end of the left bridle (1) has a milled slot (c) and a hole (d) in which a first sprocket wheel (5) for a first Gall chain can be assembled on an axle (4) inserted through the hole; the left-side storage panel having an "F-shaped" slot, which, vertically and going forth from a bottom branch of a letter "F", continues the slot (a) of the vertical runway (2), at a same depth (a1); the continuation of the vertical of the slot (a) and the top branch of the letter "F" is a slot (as) of the same width (gp) but having a a2<a1 depth; two slots that form horizontal branches of the letter "F" connect to the vertical slot with a rc radius and continue under a β angle; a vertical distance between the two slots is p; e is a distance between a bottom edge of the left-side storage panel (3) and a peak (b) of an upper part of a lower slot of the letter "F"; in the left-side storage panel (3), on a vertical line perpendicular from an axis of the hole (d) in the left bridle (1), a square orifice (m) has been made at a md distance from a lower side of the left-side storage panel (3); the assembled right-side runway (B), while mirroring the assembled left-side runway (A), is made of a right-side bridle (1'), fastened on the right-side wall, a vertical runway (2') of hc height, Ic width and gc thickness, with a slot (a') of a1<gc depth, the vertical runway (2') lies on top of and is attached to the right-side bridle (1') and a right-side storage panel (3') (FIG. 4.1, FIG. 4.2, FIG. 4.3) of hp height, Ip width and gp=gc thickness, attached to the ceiling of the premises, on top of and going onward from the runway (2'), in the right-side bridle (1') of hb height, the slot (a') of a1 depth of the vertical runway (2') continuing on a ab≤hb depth; an anterior end of the right-side bridle (1') has been subjected to a milling process (c') and there is a hole (d') in which a second sprocket wheel (5') for a second Gall chain, identical to the first sprocket wheel (5) can be assembled on an axle (4') inserted through the hole; in the right-side storage panel (3'), a vertical line perpendicular from an axis of the hole (d') in the right-side bridle (1'), a square orifice (m') has been made at the md distance from the lower side of the right-side storage panel (3'); the right-side storage panel has a "reversed F-shaped" slot that, vertically and going forth from the bottom branch of the "reversed letter F" continues the slot (a') of the vertical runway (2') at the same depth (a1); the continuation of the vertical of the slot and the top branch of the "reversed letter F" is a slot (as') of the same width, gp, but having a a2<a1 depth; two slots that form the horizontal branches of the "reversed letter F" connect to the vertical slot with a rc radius and continue under a β angle, the vertical distance between the two slots is p; e' is a distance between the bottom edge of the right-side storage panel (3') and a peak (b') between the upper part of the lower slot of the "reversed letter F"; a driving unit of the drive mechanism (C) comprising a polygonal tube (6), in which, through a left end, a motor (7) is inserted, that, at a right end, has a polygonal-headed axle (8) that slides into the tube (6) as far as a limiting concavity (u) (FIG. 1*a'*) made on the tube; after the motor (7) is inserted, at the left end of the tube (6), a distance piece (9) is glided in, which, on an outside, has a section of the tube (6) and on an inside, has about an exterior diameter of the motor; a third sprocket wheel (10) for the first Gall chain is assembled on the distance piece (9); a head (bb) of same cross-section as that of the square orifice (m) is placed axially on an encasing at the left end of the motor (7); the orifice (m) is processed in the left-side storage panel (3); at the right end of the tube (6), a distance piece (9') is glided in, which, on an outside, has the same cross-section of the tube, and, at a free end, axially, has a cylindrical head (cc) of the same cross-section as that of the cylindrical orifice (m') processed in the right-side storage panel (3'); on the distance piece (9') a fourth sprocket wheel (11) for the second Gall chain is assembled; on the third sprocket wheel (10) for the first Gall chain and the first sprocket wheel (5) for the first Gall chain the endless first Gall chain (12) is assembled; on the side facing the runway (2), the first Gall chain (12) has an upper work driving arm (13) and a lower work driving arm (23); on the fourth sprocket wheel (11) of the second Gall chain and the second sprocket wheel (5') of the second Gall chain the endless second Gall chain (12') is assembled; on the side facing the runway (2'), the second Gall chain (12') has an upper work driving arm (13') and a lower work driving arm (23'); in the assembly, a B axis of the upper work driving arm (13) is the same as the axis of the upper work driving arm (13') (FIG. 1*c'*); in the assembly, a Z-Z axis of the lower work driving arm (23) is the same as the axis of the lower work driving arm (23'); the plurality of assembled panels (E, F, G) comprise an assembled lower panel (E) of which, laterally, on both sides, is assembled an assembled lower distance module ($M_E$) (FIG. 7); several assembled intermediary panels (F) of which, laterally, on both sides, is assembled an assembled intermediary distance module ($M_F$) and an assembled upper panel (G) of which, laterally, on both sides, is assembled an assembled upper distance module ($M_G$).

2. The Retractable partition wall of claim 1, wherein the assembled intermediary panel (F) is characterized in that the assembled intermediary panel (F) comprises a panel (14) of Ipan length, hpan height and gpan thickness, which, both in the upper and the lower part, both at a t distance from both edges and in a middle, has a plurality of holes (o), of ao depth; it is only in the plurality of holes (o) on the upper part of the panel that orientation bolts (15) are assembled, which are made so that lower parts of the orientation bolts are bound in the plurality of holes (o) on the upper part of the panel (14) whereas on the free side of hpan height of the panel, with the help of an orientation bevel (to), are adapted to be guided and slide into the plurality of holes (o), of ao>bh depth, on a lower part of a next panel, when such a panel exists; laterally, on either side of each panel (F) at a x distance (FIG. 5) from the edges on the hpan height, there are two orifices (or) in which bolts (16 and 17) of an assembled intermediary distance module ($M_F$) are inserted without any clearance; when assembled, the assembled intermediary panel (F), with the assembled intermediary modules ($M_F$) to the left and to the right of the panel (14) are adapted to slide on bearings (21) on short bolts (16) along the slots (as and as'), of a2 depth, and respectively with the bearings (21) on long bolts (17), along the slots (a and a'); the assembled intermediary distance module ($M_F$) comprises two symmetrical lateral elements (18 and 18') of Lmd length, Imd>gpan width, a compression spring (19), which, when uncompressed, has a length larc, and, when compressed, has a length Icomp, a slide block (20), a short bolt (16), on which a bearing (21) is fastened, and a long bolt (17) on which another bearing (21) is fastened; each of the symmetrical elements (18 and 18') have a plurality of orifices (ot), a gliding slot (cu), that ends at a shoulder (um); the slide block (20) has a longitudinal slot (cln) of Ican length and of a width equal to the diameter of the short bolt (16) and an extension (pre) that is worked in such manner that, during assembly, the glide block (20) glides into the gliding slot (cu) under an action of the spring (19); the assembled lateral symmetrical elements (18 and 18'), compression spring (19) and glide block (20) are fastened with some screws (22); the bolts (16 and 17) are assembled through the plurality of orifices (ot) and, on them, the bearings (21) are assembled without any clearance.

3. The Retractable partition wall of claim 2, wherein the assembled lower panel (E) is characterized in that the assembled lower panel(E) differs from the assembled intermediary panel (F) in that the assembled lower panel (E) has, at both ends, an assembled lower distance module ($M_E$); the assembled lower distance module ($M_E$) differs from the assembled intermediary distance piece ($M_F$) in that the assembled lower distance module ($M_E$) has two identical and mirroring small face plates (24 and 24') assembled between the bolts (16 and 17) with the screws (22), both plates having a drive slot in them (cm, respectively cm').

4. The Retractable partition wall of claim 2, wherein the assembled upper panel (G) is characterized in that the assembled upper panel (G) differs from the assembled intermediary panel (F) in that the assembled upper panel (G) has, at both ends, an assembled upper distance module ($M_G$); the assembled upper distance module ($M_G$) as compared to the assembled intermediary distance module ($M_F$), the assembled upper distance module ($M_G$) has a coupler jaw (26) that is assembled on a sliding block (20) with a screw bolt (25).

* * * * *